United States Patent

Rainer et al.

[15] 3,652,909
[45] Mar. 28, 1972

[54] BRUSHLESS STEPPING MOTOR

[72] Inventors: Erich Rainer, Duisburg-Grossenbaum; Gerhard Kroger, Veitsbronn, both of Germany

[73] Assignee: Siemens Aktiengesellschaft, Berlin and Munich, Germany

[22] Filed: Apr. 15, 1970

[21] Appl. No.: 28,868

[30] Foreign Application Priority Data

Apr. 17, 1969 Germany ..................P 19 19 442.4

[52] U.S. Cl. ..............................318/254, 318/138, 318/685
[51] Int. Cl. ..........................................................H02v 29/00
[58] Field of Search ..................318/138, 254, 439, 696, 685

[56] References Cited

UNITED STATES PATENTS 3,324,369  6/1967  Markakis ..........................318/696 X
3,345,547  10/1967  Dunne ..................................318/696
3,486,099  12/1969  Brunner et al. ....................318/138 X
3,517,289  6/1970  Brunner et al. ....................318/254 X Primary Examiner—G. R. Simmons
Attorney—Curt M. Avery, Arthur E. Wilfond, Daniel J. Tick and Herbert L. Lerner

[57] ABSTRACT

Each of a plurality of switching transistors is connected to a corresponding one of the rotor windings of a brushless stepping motor. A control circuit coupled to the windings controls the windings so that the rotor rotates stepwise and supplies control pulses to the transistors. The switching transistors are mutually displaced by 180° and are connected in a pair of bistable multivibrator circuits which change their condition alternately after each of the control pulses. The control circuit switches the bistable multivibrator circuits to a preferred condition corresponding to the instantaneous position of the rotor after an interruption of the supply voltage.

1 Claim, 4 Drawing Figures

BRUSHLESS STEPPING MOTOR

DESCRIPTION OF THE INVENTION

The invention relates to a brushless stepping motor. More particularly, the invention relates to a brushless stepping motor particularly adaptable as a counting device.

The brushless stepping motor of the invention has four windings which are equiangularly spaced from each other by 90°. Each of a plurality of switching transistors is connected to a corresponding one of the windings. The windings are cyclically controlled in a manner whereby a two pole permanently magnetized rotor rotates stepwise. The switching transistors are mutually displaced by 180° and are connected in a pair of bistable multivibrator circuits. The bistable multivibrator circuits alternately change their condition after each of the control pulses.

Brushless motors of the aforedescribed type have operated excellently. However, they have the disadvantage that after the supply voltage has been interrupted and then reapplied, the bistable multivibrator circuits have no definite conditions, but rather have conditions which depend upon coincidence. The condition of each multivibrator does not usually correspond to the instantaneous position of the rotor of the motor. Thus, when the motor is utilized as a counting device, counting errors may arise.

The principal object of the invention is to provide a new and improved brushless stepping motor.

An object of the invention is to provide a brushless stepping motor which overcomes the disadvantage of the known stepping motor.

An object of the invention is to provide a brushless stepping motor which switches each bistable multivibrator to a preferred condition corresponding to the instantaneous position of the rotor after an interruption of the supply voltage.

An object of the invention is to provide a brushless stepping motor which functions with efficiency, effectiveness and reliability.

In accordance with the invention, a brushless stepping motor comprises a two pole permanently magnetized rotor. Four windings are equiangularly spaced from each other by 90°. A source of supply voltage energizes the windings. Control means coupled to the windings cyclically controls the windings in a manner whereby the rotor rotates stepwise. Each of a plurality of switching transistors is connected to a corresponding one of the windings. The control means supplies control pulses to the transistors. The switching transistors are mutually displaced by 180° and are connected in a pair of bistable multivibrator circuits which change their condition alternately after each of the control pulses. The control means switches the bistable multivibrator circuits to a preferred condition corresponding to the instantaneous position of the rotor after an interruption of the supply voltage.

A rotor indicator has galvanomagnetic resistances in operative proximity with the rotor and in spaced relation with each other. The rotor indicator indicates the instantaneous position of the rotor.

The rotor indicator has two difference amplifiers each having a pair of transistors having emitter, collector and base electrodes. The collector electrode of each of the transistors is coupled to the base electrode of a corresponding one of the switching transistors. Each of a pair of Hall generators has a pair of Hall electrodes connected to the base electrodes of the transistors of a corresponding one of the difference amplifiers.

In order that the invention may be readily carried into effect, it will now be described with reference to the accompanying drawings, wherein.

In the FIGS., the same components are identified by the same reference numerals.

Figure 1:
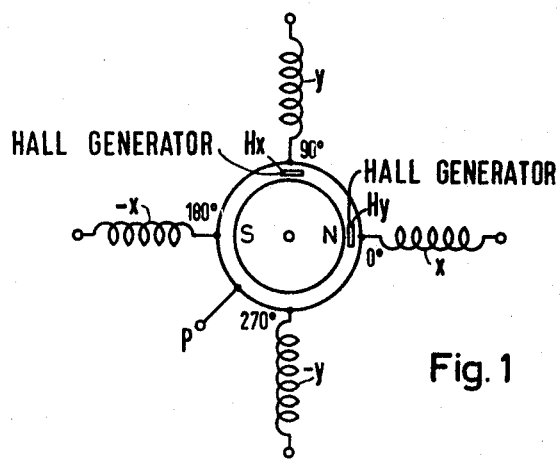
FIG. 1 is a schematic diagram of an embodiment of the brushless stepping motor of the invention.

In FIG. 1, the rotor of a brushless stepping motor is a two pole permanently magnetized rotor having a polarity indicated as N and S. The motor has four stator windings $x$, $y$, $-x$ and $-y$. The stator windings are denoted in accordance with the coordinate system. The stator windings are connected in common at one end thereof. The common connected ends of the stator windings $x$, $y$, $-x$ and $-y$ are connected to the positive polarity terminal of a source of current.

Figure 4:
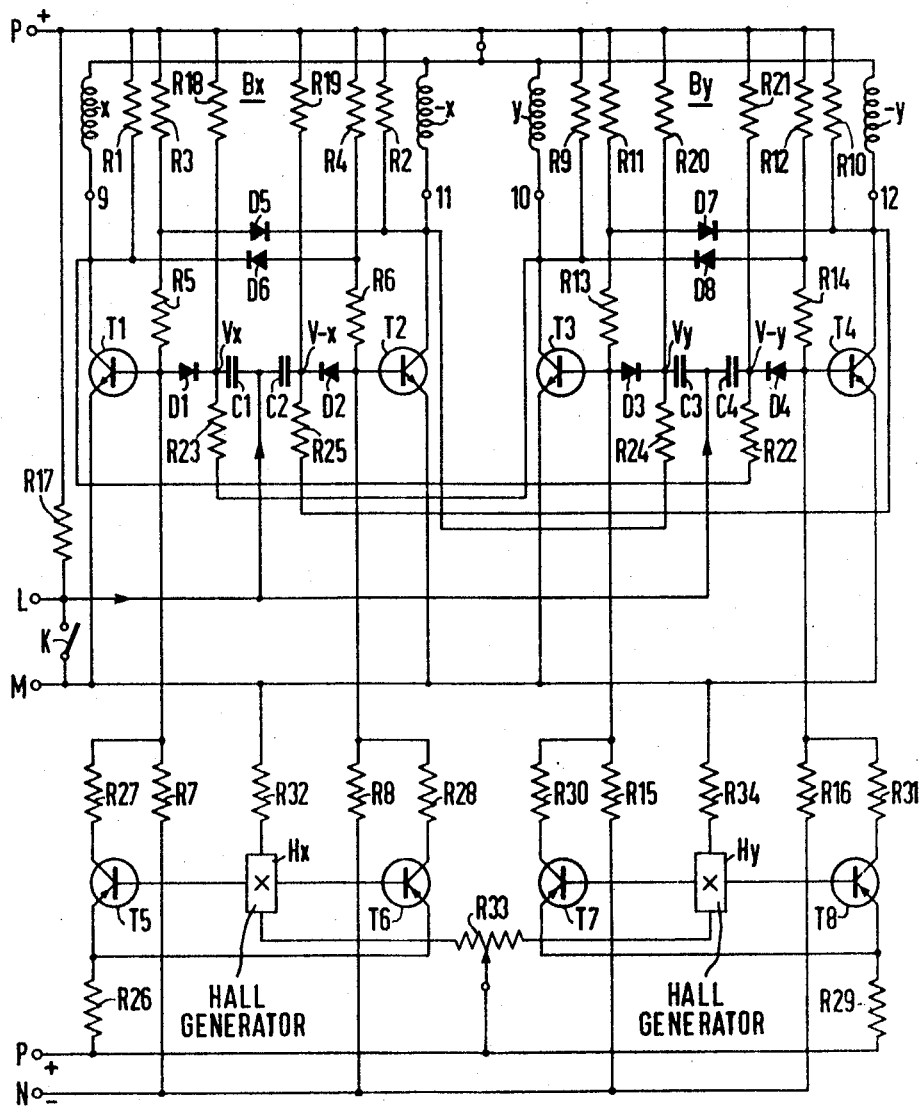
FIG. 4 is a circuit diagram of an embodiment of the brushless stepping motor of the invention.

The other ends of the stator windings $x$, $y$, $-x$ and $-y$ are connected to the collector electrodes of corresponding ones of a plurality of switching transistors, as shown in FIG. 4. A magnetic field which rotates stepwise, counterclockwise, and which acts upon the rotor, is provided by a current flow through the stator windings $x$, $y$, $-x$ and $-y$ in the following sequence.

$$x, y, -x, -y$$

During rotation of the magnetic field in a clockwise direction, the stator windings $x$, $y$, $-x$, $-y$ are controlled in accordance with the following sequence.

$$x, -y, -x, y$$

If the rotating field vector is provided by a current flow through two of the stator windings, a field vector rotating counterclockwise is provided by a current flow through the individual windings in the following sequence.

$$x+y, -x+y, -x-y, -y+x$$

A field vector which rotates in clockwise direction is provided in accordance with the following sequence.

$$x+y, x-y, -y-x, -x+y$$

A 90° step occurs when one component is changed by 180°. This permits the construction of the stepping motor with only two bistable multivibrators or flip flops. The stepping motor operates because both bistable multivibrator circuits change their condition alternately after each control pulse.

Figure 2:
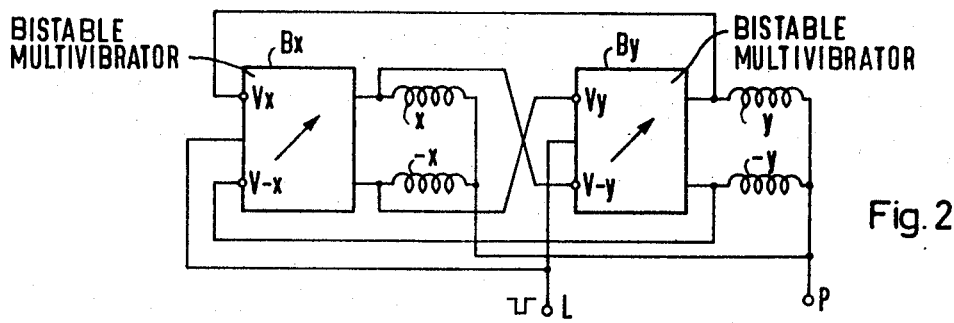
FIG. 2 is a block diagram of an embodiment of the brushless stepping motor of the invention.

In FIG. 2, which illustrates the brushless stepping motor of the invention, a bistable multivibrator circuit B$x$ is connected to two stator windings $x$ and $-x$ and has a pair of switching inputs V$x$ and V$-x$. The brushless stepping motor also comprises a second bistable multivibrator circuit B$y$ connected to the stator windings $y$ and $-y$ and having switching inputs V$y$ and V$-y$.

The outputs of the bistable multivibrator circuit B$y$ are connected to the switching inputs V$x$ and V$-x$, respectively, of the bistable multivibrator circuit B$x$. The outputs of the bistable multivibrator B$x$ are connected to the switching inputs V$-y$ and V$y$, respectively, of the bistable multivibrator circuit B$y$. The bistable multivibrators are controlled by a pulse supplied via an input terminal L. The input terminal L is connected in common to each of the bistable multivibrators B$x$ and B$y$.

Each of the two bistable multivibrators B$x$ and B$y$ changes in condition during the dynamic control thereof, only when the switching input and the corresponding output are switched to zero. The condition of the bistable multivibrators B$x$ and B$y$ is indicated by the arrows in each of the blocks representing said bistable multivibrators. Thus, the winding to which the head of the arrow points conducts the current. In accordance with FIG. 2, such windings are the windings $x$ and $y$. The outputs of the flip flops B$x$ and B$y$ connected to the current conducting windings are therefore connected to zero potential.

In accordance with the rule that a bistable multivibrator changes its condition during dynamic control, only if the switching input and the corresponding output are switched to zero, the output for the winding $x$ and the switching input V$x$ are at zero potentials. If a control pulse is supplied via the input terminal L, the bistable multivibrator B$x$ is switched to its other condition. As a result, the winding $x$ is free of current and current flows in the winding $-x$.

When the flip flop B$x$ is switched in condition, in the aforedescribed manner, so that it is switched from its set to its reset condition, the rotor will rotate 90° in counterclockwise direction. The rotor thus moves to an instantaneous position of 135°, in accordance with FIG. 1. Since the output of the flip flop B$x$ connected to the winding $-x$ is then at zero potential, the switching input V$y$ of the flip flop By is also at zero potential. Since zero potential is also applied to the corresponding output of the flip flop B$y$, said flip flop changes its condition during the next control pulse. As a result, the windings $-x$ and $y$ conduct current. This results in a new stepwise movement of the rotor by 90°, in clockwise direction.

The rotor is continuously switched in the opposite direction when the switching inputs of the individual flip flops are exchanged with each other. That is, the rotor is continuously switched in the opposite direction when the output of the flip flop B$y$ which is connected to the winding $y$ is connected to the switching input V$-x$ of the flip flop B$x$, the switching input V$x$ of the flip flop B$x$ is connected to the switching input V$y$ of the flip flop B$y$ and the output of the flip flop B$x$ connected to the winding $-x$ is connected to the switching input V$-y$ of the flip flop B$y$.

FIG. 4 is the complete circuit arrangement of the brushless stepping motor of FIGS. 1 and 2. A pair of switching transistors T1 and T2 are connected as a bistable multivibrator circuit or flip flop B$x$. The winding $x$ is connected to the collector electrode of the transistor T1 and the winding $-x$ is connected to the collector electrode of the transistor T2. The flip flop B$x$ also includes a plurality of resistors R1, R2, R3, R4, R5, R6, R7 and R8, and a pair of diodes D5 and D6.

A pair of switching transistors T3 and T4 are connected as a second bistable multivibrator circuit or flip flop B$y$. The winding $y$ is connected to the collector electrode of the transistor T3. The winding $-y$ is connected to the collector electrode of the transistor T4. The flip flop B$y$ includes a plurality of resistors R9, R10, R11, R12, R13, R14, R15 and R16, and a pair of diodes D7 and D8.

The individual switching transistors T1, T2, T3 and T4 are cyclically controlled by four capacitors C1, C2, C3 and C4. The capacitors C1 and C2 are connected to each other, the capacitors C3 and C4 are connected to each other and a common point in the connection of each is directly connected to the other. The capacitors C1 to C4 are cyclically controlled via a resistor R17 connected to the positive polarity terminal of the source of current. The electrode of the capacitor C1 which is not connected in common with the other capacitors is connected to the switching input V$x$ of the flip flop B$x$. The electrode of the capacitor C2 which is not connected to the other capacitors is connected to the switching input V$-y$ of the flip flop B$x$. The electrode of the capacitor C3 which is not connected to the other capacitors is connected to the switching input V$y$ of the flip flop B$y$. The electrode of the capacitor C4 which is not connected to the other capacitors is connected to the switching input V$-y$ of the flip flop B$y$. The switching input V$x$ is connected to the positive polarity terminal P of the current source via a resistor R18. The switching input V$-x$ is connected to the positive polarity terminal P of the current source via a resistor R19. The switching input V$y$ is connected to the positive polarity terminal P of the current source via a resistor R20. The switching input V$-y$ is connected to the positive polarity terminal P of the current source via a resistor R21. The switching input V$x$ is coupled to the base electrode of the transistor T1 via a diode D1. The switching input V$-x$ is coupled to the base electrode of the transistor T2 via a diode D2. The switching input V$y$ is coupled to the base electrode of the transistor T3 via a diode D3. The switching input V$-y$ is coupled to the base electrode of the transistor T4 via a diode D4.

The emitter electrodes of the transistors T1, T2, T3 and T4 are connected in common to a lead which is connected to the control pulse input terminal L via a switch K. The input terminal L is at zero potential. The switch K permits the application of the zero potential of the input terminal L to the capacitors C1 to C4.

The circuit arrangement of FIG. 4 operates as follows. It is assumed that, in accordance with FIG. 2, the windings $x$ and $y$ conduct current and that the transistors T1 and T3 are in their conductive condition, so that the outputs of the flip flops B$x$ and B$y$ which are connected to the windings $x$ and $y$ are at zero potential, and the zero potential is applied, via resistors R22 and R23 (FIG. 4), to the switching inputs V$-y$ and V$x$. As a result of the application of the zero potential, the capacitors C1 and C4 may be charged. That is, a current flows from the positive polarity terminal P, via the resistor R17, the capacitor C1, the resistor R23 and the collector-emitter path of the transistor T3, and from said positive polarity terminal, via the resistor R17, the capacitor C4, the resistor R22 and the collector-emitter path of the transistor T1. The transistors T2 and T4 are switched to their nonconductive condition, since the base potential of said transistors is accordingly decreased by a current flow via the resistors R4 and R12, respectively, the diodes D6 and D8, respectively, and the collector-emitter path of the transistors T1 and T4, respectively.

If the potential is decreased from a positive potential to zero potential at the contact points of the four capacitors C1 to C4, by closing the switch K, in order to continue the switching of the motor, the capacitors C1 and C4 are recharged. This is due to the fact that the current flows from the positive polarity terminal P only via the resistors R3 and R5 and the resistors R12 and R14, respectively, the diodes D1 and D4, respectively, the capacitors C1 and C4, respectively, and the control pulse input terminal L.

The negative voltage of the capacitors C1 and C4 reduces the base potential of the transistors T1 and T4 so considerably that the transistor T1 is switched to its nonconductive condition. The condition of the transistor T4 does not change, since said transistor is in its nonconductive condition. Therefore, nothing changes in the switching condition of the flip flop B$y$. On the other hand, the bistable multivibrator B$x$ is switched to its other condition, since a base current may flow in the transistor T2, via the resistors R4 and R6. A flow of current from the positive polarity terminal P, via the resistor R3, the diode D5 and the collector-emitter path of the transistor T2, maintains the transistor T1 in its nonconductive condition due to a decrease in the base potential. Accordingly, the stator windings $-x$ and $-y$ conduct current, so that the rotor is rotated 90° counterclockwise.

Since the switching input V$y$ of the flip flop B$y$ has a zero potential applied thereto, via the resistor R24, the capacitor C3 charges via the resistors R17 and R24 and the collector-emitter path of the transistor T2, to the potential of the positive polarity terminal P. The capacitor C1 is recharged, but does not affect the switching operation, however.

As soon as the switch K is again closed, the potential at the junction points of the capacitors C1, C2, C3 and C4 is so considerably decreased that the capacitors C1 and C3 are recharged. The capacitor C3 is charged via a circuit from the positive polarity terminal P, via the resistors R11 and R13, to diode D3, the resistor R24 and the collector-emitter path of the transistor T2, to the lead M. This causes the base potential of the transistor T3 to be decreased to such an extent that said transistor is switched to its nonconductive condition and the transistor T4 is switched to its conductive condition.

The transistor T4 is switched to its conductive condition because the switching of the transistor T3 to its nonconductive condition interrupts the blocking current of the transistor T4, via the resistor R12 and the diode D8. Only the stator windings $-x$ and $-y$ then conduct current. This corresponds to continued switching of the rotor by 90° in a counterclockwise direction. The switching input V$-x$ has zero potential applied thereto, so that the capacitor C2 charges via the resistor R17.

When the switch K is closed and the next pulse is supplied, the capacitor C2 is recharged via the resistors R4 and R6, and the diode D2. This results in the switching of the transistor T2 to its nonconductive condition and the switching of the transistor T1 to its conductive condition. The stator windings $x$ and $-y$ are then connected to the current source which results in an additional movement of the rotor by 90° in the clockwise direction. The bistable multivibrator By is then again switched in its condition, so that it returns to its initially described switching condition in which the windings x and y conduct current.

When a stepping motor of the type of the invention is utilized to count, then, even when the supply voltage is interrupted and then reapplied, the stepping motor must always recommence operation in the same condition in which it was when the supply voltage was interrupted. Since bistable multivibrators cannot assume a specific switching condition after the interruption of the supply voltage, the aforedescribed goal may be achieved only if the bistable multivibrators are switched to conditions which correspond to the instantaneous positions of the rotor, when the supply voltage is reapplied. This is accomplished, in accordance with the invention, by a pair of Hall generators Hx and Hy. The Hall generators Hx and Hy are displaced from each other by 90° and are appropriately influenced by the magnetic field of the rotor, as shown in FIG. 1.

Figure 3:
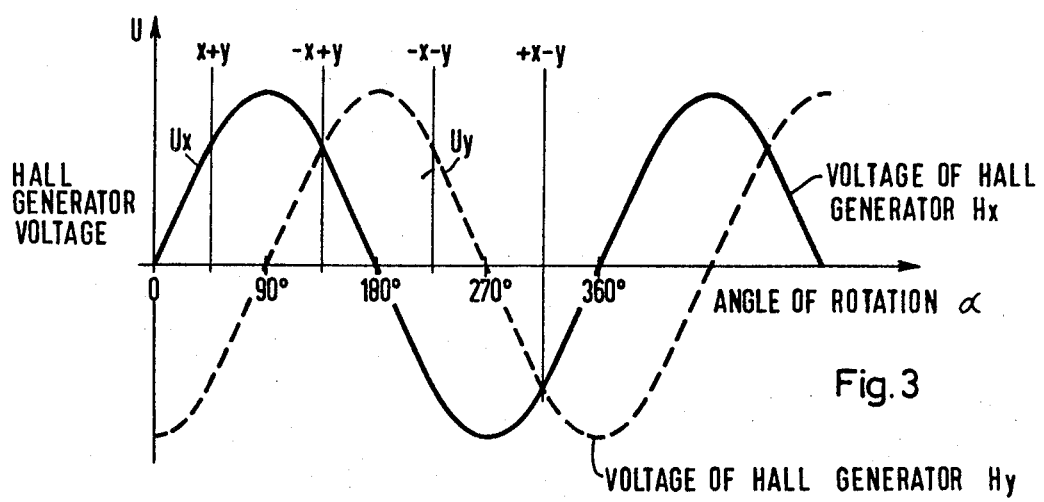
FIG. 3 is a graphical presentation of the voltages provided by the Hall generators in accordance with the instantaneous rotor position.

FIG. 3 illustrates the dependency of the Hall generator voltages upon the angle of rotation of the rotor. In FIG. 3, the abscissa represents the angle of rotation $\alpha$ of the rotor and the ordinate represents the Hall generator voltage U. The voltage of the Hall generator Hx is illustrated by the curve Ux in solid lines. The voltage of the Hall generator Hy is illustrated by the curve Uy in broken lines. If, for example, the stator winding x is excited or energized, the positive polarity terminal P applies a positive potential, the rotor adjusts so that the Hall generator voltage Ux is equal to zero, and the voltage Uy of the Hall generator Hy is greater than zero.

When the stator winding y is excited or energized, the Hall generator voltage Ux is greater than zero and the Hall generator voltage Uy equals zero. If both stator windings x and y conduct current of equal magnitudes simultaneously, the rotor adjusts to the resultant vector which is around 45°. The Hall generator voltage Ux is then greater than zero and the Hall generator voltage Uy is less than zero. When the stator windings y and −x are excited or energized, the Hall generator voltages Ux and Uy are greater than zero. When the stator windings −x and −y are excited or energized, the Hall generator voltage Ux is less than zero and the Hall generator voltage Uy is greater than zero. When the stator windings x and −y are excited or energized, the Hall generator voltages Ux and Uy are each less than zero.

The foregoing description illustrates that the polarities of the Hall voltages in the individual systems change alternately in correspondence with the initially described control of the stepping motor.

In FIG. 4, a pair of transistors T5 and T6 are connected as a first difference amplifier. The first difference amplifier is controlled by the Hall generator Hx. A second pair of transistors T7 and T8 are connected as a second difference amplifier. The second difference amplifier is controlled by the Hall generator Hy. The emitter electrode of the transistor T5 and the emitter electrode of the transistor T6 are connected in common via a resistor R26 to the positive polarity terminal P of the source of current. The collector electrode of the transistor T5 is connected to the base electrode of the transistor T1 via a resistor R27. The collector electrode of the transistor T6 is connected to the base electrode of the transistor T2 via a resistor R28.

The emitter electrode of the transistor T7 and the emitter electrode of the transistor T8 are connected in common, via a resistor R29, to the positive polarity terminal P of the source of current. The collector electrode of the transistor T7 is connected to the base electrode of the transistor T3 via a resistor R30. The collector electrode of the transistor T8 is connected to the base electrode of the transistor T4 via a resistor R31.

The control current for the Hall generator Hx is provided via resistors R32 and R33. The control current for the Hall generator Hy is provided via resistors R34 and R33. The resistor R33 is a variable resistor. The output current of each of the difference amplifiers depends upon the polarity of the Hall voltage produced by the corresponding Hall generator. The output currents of the difference amplifiers influence the corresponding flip flop circuits in a manner whereby upon the reapplication of the supply voltage, said flip flop circuits are switched to a preferred condition, which preferred condition corresponds to the instantaneous polarity of the Hall voltage. The normal control of the motor prevails during operation, however.

The invention is not limited in application to a specific type of stepping motor, but may be applied to any suitable type of stepping motor. Furthermore, the number of stator windings is insignificant.

While the invention has been described by means of a specific example and in a specific embodiment, we do not wish to be limited thereto, for obvious modifications will occur to those skilled in the art without departing from the spirit and scope of the invention.

We claim:

1. A brushless stepping motor, comprising
a two pole permanently magnetized rotor;
four windings equiangularly spaced from each other by 90°;
a source of supply voltage for energizing said windings;
control means coupled to said windings for cyclically controlling said windings in a manner whereby said rotor rotates stepwise;
a plurality of switching transistors each connected to a corresponding one of said windings, said control means supplying control pulses to said transistors, said switching transistors being mutually displaced by 180° and being connected in a pair of bistable multivibrator circuits which change their condition alternately after each of said control pulses, said control means switching said bistable multivibrator circuits to a preferred condition corresponding to the instantaneous position of said rotor after an interruption of the supply voltage; and
rotor indicating means having two difference amplifiers each having a pair of transistors having emitter, collector and base electrodes, the collector electrode of each of said transistors being coupled to the base electrode of a corresponding one of said switching transistors, and a pair of Hall generators each having a pair of Hall electrodes connected to the base electrodes of the transistors of a corresponding one of said difference amplifiers.

* * * * *